(12) United States Patent
Zhang et al.

(10) Patent No.: US 7,986,800 B2
(45) Date of Patent: Jul. 26, 2011

(54) DEVICE WITH ACOUSTIC GUARD

(75) Inventors: Ming Zhang, Cupertino, CA (US); Kai Xu, Cupertino, CA (US)

(73) Assignee: Fortemedia, Inc., Cupertino, CA (US)

( * ) Notice: Subject to any disclaimer, the term of this patent is extended or adjusted under 35 U.S.C. 154(b) by 1192 days.

(21) Appl. No.: 11/676,677

(22) Filed: Feb. 20, 2007

(65) Prior Publication Data
US 2008/0199034 A1 Aug. 21, 2008

(51) Int. Cl.
*H04R 25/00* (2006.01)
(52) U.S. Cl. .................................. 381/189; 381/357
(58) Field of Classification Search .......... 381/355–358, 381/365, 189, 337–339
See application file for complete search history.

(56) References Cited

U.S. PATENT DOCUMENTS

| | | | | |
|---|---|---|---|---|
| 2,228,886 A | * | 1/1941 | Olson | 381/357 |
| 3,963,881 A | * | 6/1976 | Fraim et al. | 381/357 |
| 5,226,076 A | * | 7/1993 | Baumhauer et al. | 381/357 |
| 5,970,159 A | * | 10/1999 | McIntosh | 381/357 |
| 6,285,771 B1 | * | 9/2001 | Killion et al. | 381/357 |

FOREIGN PATENT DOCUMENTS

CN 2854991 Y 1/2007

OTHER PUBLICATIONS

English language translation of abstract of CN 2854991Y (published Jan. 3, 2007).

* cited by examiner

*Primary Examiner* — Suhan Ni
(74) *Attorney, Agent, or Firm* — Thomas|Kayden

(57) ABSTRACT

A device includes a main body, a microphone module, and an acoustic guard. The microphone module is connected to the main body and comprises a first acoustic opening and a second acoustic opening, wherein the microphone module receives sound waves via both the first and second acoustic openings. The acoustic guard covers the second acoustic opening and comprises a first sound inlet via which the sound waves enter the acoustic guard and reach the second acoustic opening.

20 Claims, 11 Drawing Sheets

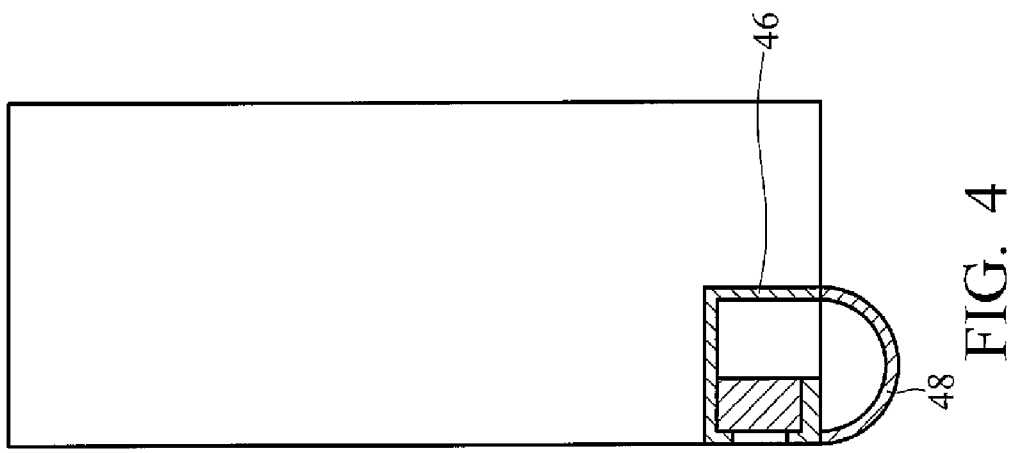

DEVICE WITH ACOUSTIC GUARD

BACKGROUND OF THE INVENTION

1. Field of the Invention

The invention relates to a device with an acoustic guard protecting a microphone module from reflected sound waves.

2. Description of the Related Art

A microphone module can be mounted in a rearview mirror or global positioning system (GPS) receiver in a car for the driver or passengers to communicate. As shown in FIGS. 1A and 1B, for example, a unidirectional microphone 16 is mounted in a GPS receiver 14 to receive sound via two acoustic openings 161 and 162. The unidirectional microphone 16 is provided to clearly receive sound from the driver (or passengers) in front of the GPS receiver 14 and avoid environmental noise. Directivity of the unidirectional microphone 16 (sensitivity of a microphone more in one direction than another), however, is deteriorated or even cancelled.

BRIEF SUMMARY OF THE INVENTION

The invention provides a solution to solve the described problem. It is considered that the described problem arises from sound waves reflected by the windshield behind the GPS receiver. In detail, the second acoustic opening at the top of the GPS receiver is exposed to the sound waves reflected from the windshield. Thus, the unidirectional microphone receives sound not only from the driver (or passengers) but from the windshield, thus resulting in the described problem.

To solve the described problem, a device (e.g. GPS receiver, rearview mirror, and others) in accordance with an exemplary embodiment of the invention includes a main body, a microphone module, and an acoustic guard. The microphone module is connected to the main body and comprises a first acoustic opening and a second acoustic opening to receive sound waves. The acoustic guard covers the second acoustic opening and comprises a first sound inlet allowing the sound waves to enter the acoustic guard and reach the second acoustic opening.

The acoustic guard may be oriented lengthwise, with the first sound inlet provided at an end thereof.

The acoustic guard may further comprise a second sound inlet provided at the other end thereof.

The microphone module may further comprise a unidirectional microphone receiving the sound waves via the first and second acoustic openings, a third acoustic opening, and an omnidirectional microphone receiving the sound waves via the third acoustic opening.

The unidirectional microphone comprises a front surface receiving the sound waves via the first acoustic opening, and a rear surface receiving the sound waves via the second acoustic opening.

The unidirectional microphone and the omnidirectional microphone may be disposed in different chambers and acoustically isolated from each other.

The acoustic opening may be attached to the top or bottom of the main body.

A device in accordance with another exemplary embodiment of the invention includes a main body, a microphone module, and an acoustic guard. The microphone module is connected to the main body and comprises a first acoustic opening and a second acoustic opening to receive sound waves. The acoustic guard covers the second acoustic opening, is oriented lengthwise, and opens at an end thereof.

The acoustic guard may be closed at the other end, or open at both ends.

The acoustic guard may extend in a first direction and open towards the first direction.

The acoustic guard may extend in a first direction and open towards a second direction perpendicular to the first direction.

The microphone module may further comprise a unidirectional microphone receiving the sound waves via the first and second acoustic openings, a third acoustic opening, and an omnidirectional microphone receiving the sound waves via the third acoustic opening.

The unidirectional microphone may comprise a front surface receiving the sound waves via the first acoustic opening, and a rear surface receiving the sound waves via the second acoustic opening.

The unidirectional microphone and the omnidirectional microphone may be disposed in different chambers and acoustically isolated from each other.

The acoustic guard may be closed at the other end, or open at both ends.

A device in accordance with another exemplary embodiment of the invention includes a main body, a microphone module, and a tube. The microphone module is connected to the main body and comprises a first acoustic opening and a second acoustic opening to receive sound waves. The tube includes a first sound inlet via which the sound waves enter the tube and reach the second acoustic opening.

The tube may further include a second sound inlet connected to the second acoustic opening of the microphone module.

The tube may be built in the main body.

In operation, sound waves are reflected from the windshield towards the microphone module. Nevertheless, the directivity of the microphone module is maintained because the acoustic guard protects the second acoustic opening of the microphone module from the reflected sound waves.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4 depicts a device with an acoustic guard in accordance with another embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
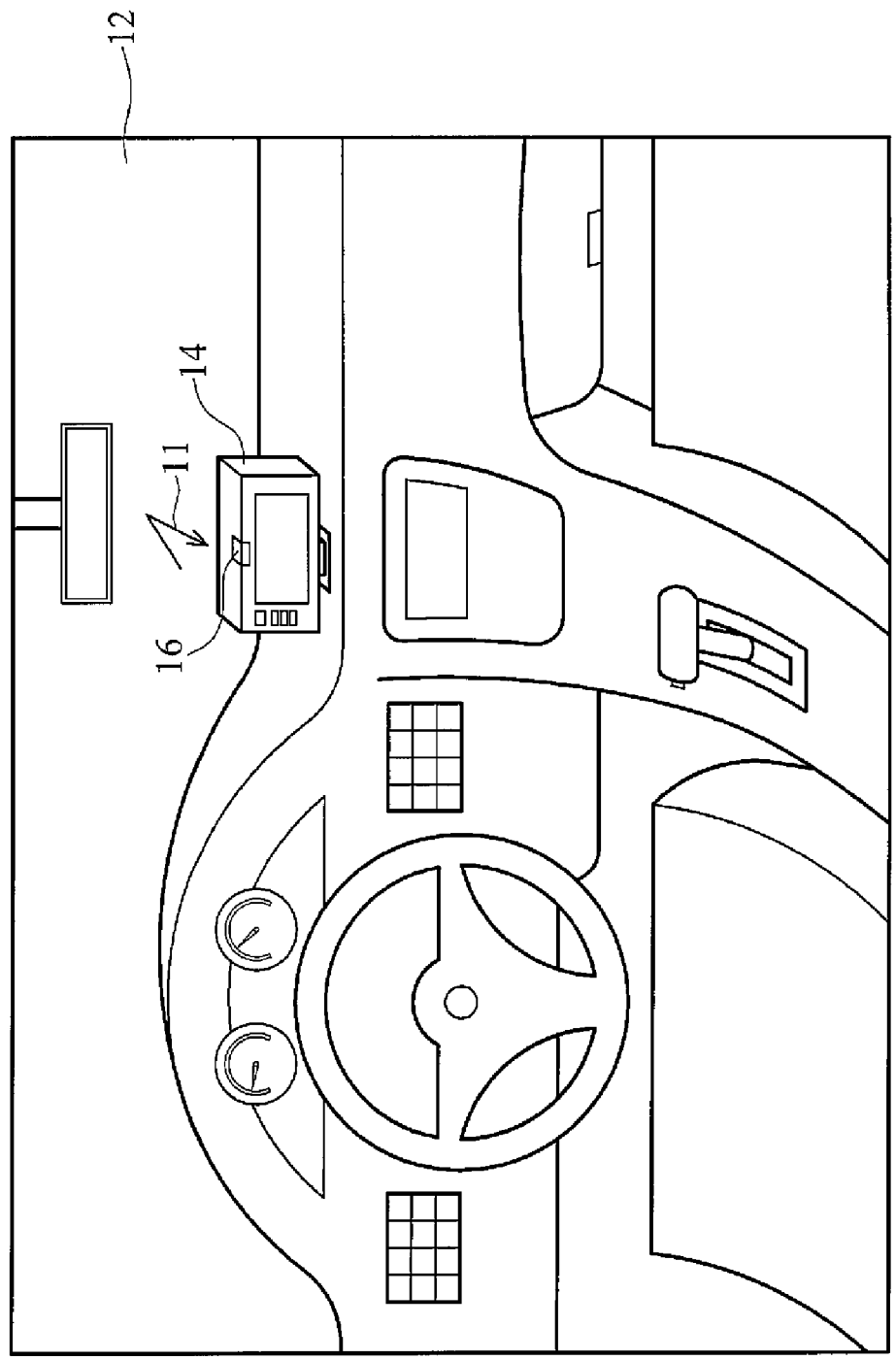
FIG. 1A depicts a global positioning system (GPS) receiver with a unidirectional microphone to receive sound in a car.
Figure 1B:
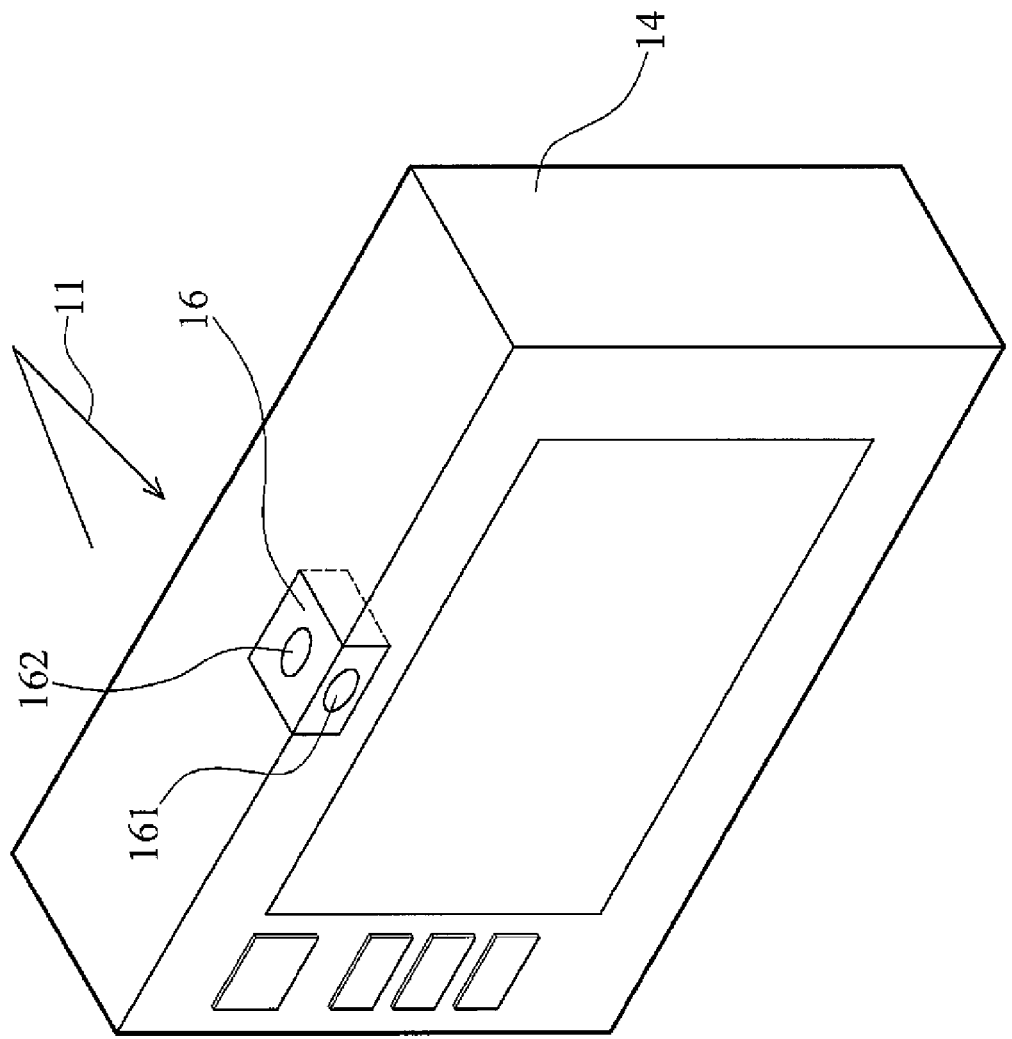
FIG. 1B is an enlarged view of the GPS receiver of FIG. 1A.
Figure 2A:
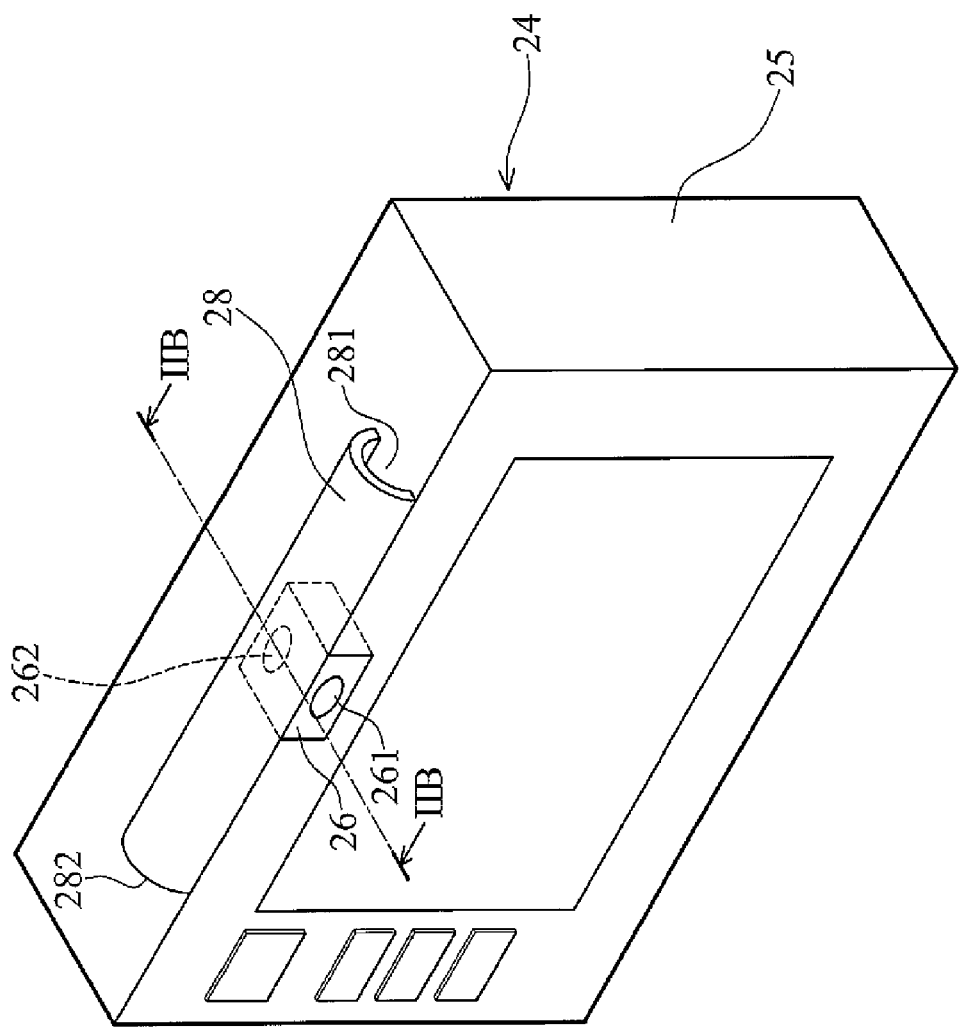
FIG. 2A depicts a device with an acoustic guard in accordance with an embodiment of the invention.
Figure 2B:
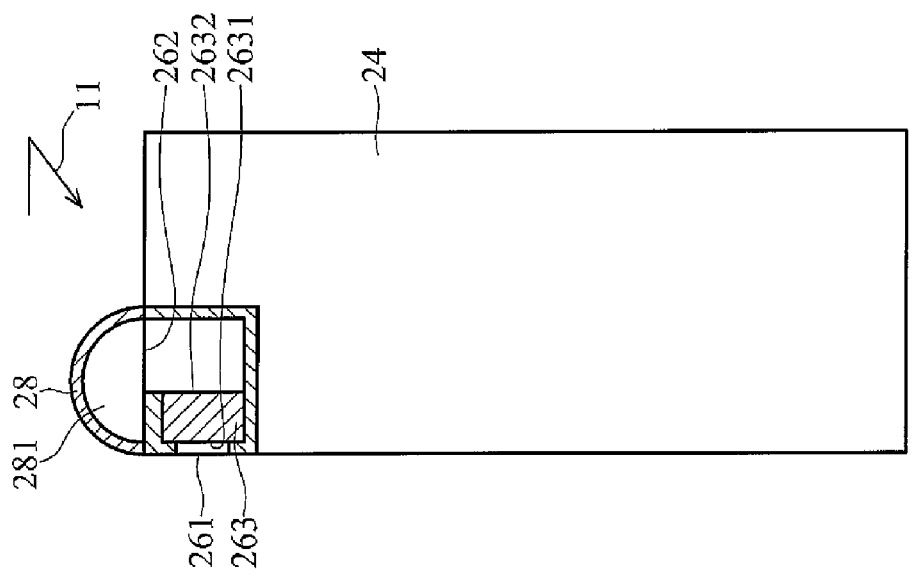
FIG. 2B is a sectional view of the device of FIG. 2A along line IIB-IIB.

Referring to FIGS. 2A and 2B, a device 24 of an embodiment of the invention includes a main body 25, a microphone module 26, and an acoustic guard 28.

The microphone module 26 has a first acoustic opening 261 at its front, a second acoustic opening 262 at its top, and a unidirectional microphone 263 inside. The unidirectional microphone 263 has a front surface 2631 receiving external sound via the first acoustic opening 261 and a rear surface 2632 receiving external sound via the second acoustic opening 262.

Note that the first acoustic opening 261 opens towards the front and the second acoustic opening 262 opens upwards. If the device 24 has a sound source (not shown) at the front and a reflector (not shown) at the rear, the second acoustic opening 262 at the top of the device 24 is exposed to the sound waves reflected from the reflector. To avoid reflected sound waves, the second acoustic opening 262 of the microphone module 26 is covered by the acoustic guard 28.

The acoustic guard 28 is oriented lengthwise and attached to the main body 25, with a first sound inlet 281 and a second sound inlet 282 formed at both ends thereof. The first sound inlet 281 and the second sound inlet 282 allow the unidirectional microphone 263 to receive external sound waves via the second acoustic opening 262.

As shown in FIG. 2B, in operation, sound waves 11 are reflected from the reflector behind the device 24 towards the microphone module 26. Nevertheless, the directivity of the microphone module 26 is maintained because the acoustic guard 28 protects the second acoustic opening 262 of the microphone module 26 from the reflected sound waves 11.

Figure 3:
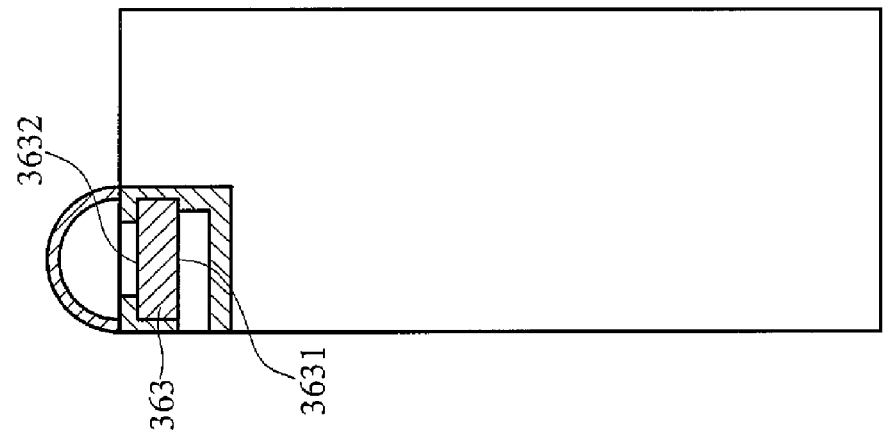
FIG. 3 depicts a device with an acoustic guard in accordance with another embodiment of the invention.

While in FIG. 2B, the unidirectional microphone 263 is oriented vertically, horizontal orientation is equally applicable, as shown in FIG. 3, wherein the front surface 3631 of the unidirectional microphone 363 faces downwards and the rear surface 3632 faces upwards.

In FIGS. 2A and 2B, the microphone module 26 and the acoustic guard 28 are mounted at the top of the main body 24. It is understood that, however, the microphone module and the acoustic guard can be mounted at the bottom of the main body as shown in FIG. 4, wherein reference numerals 46 and 48 indicate the microphone module and the acoustic guard, respectively.

Figure 5A:
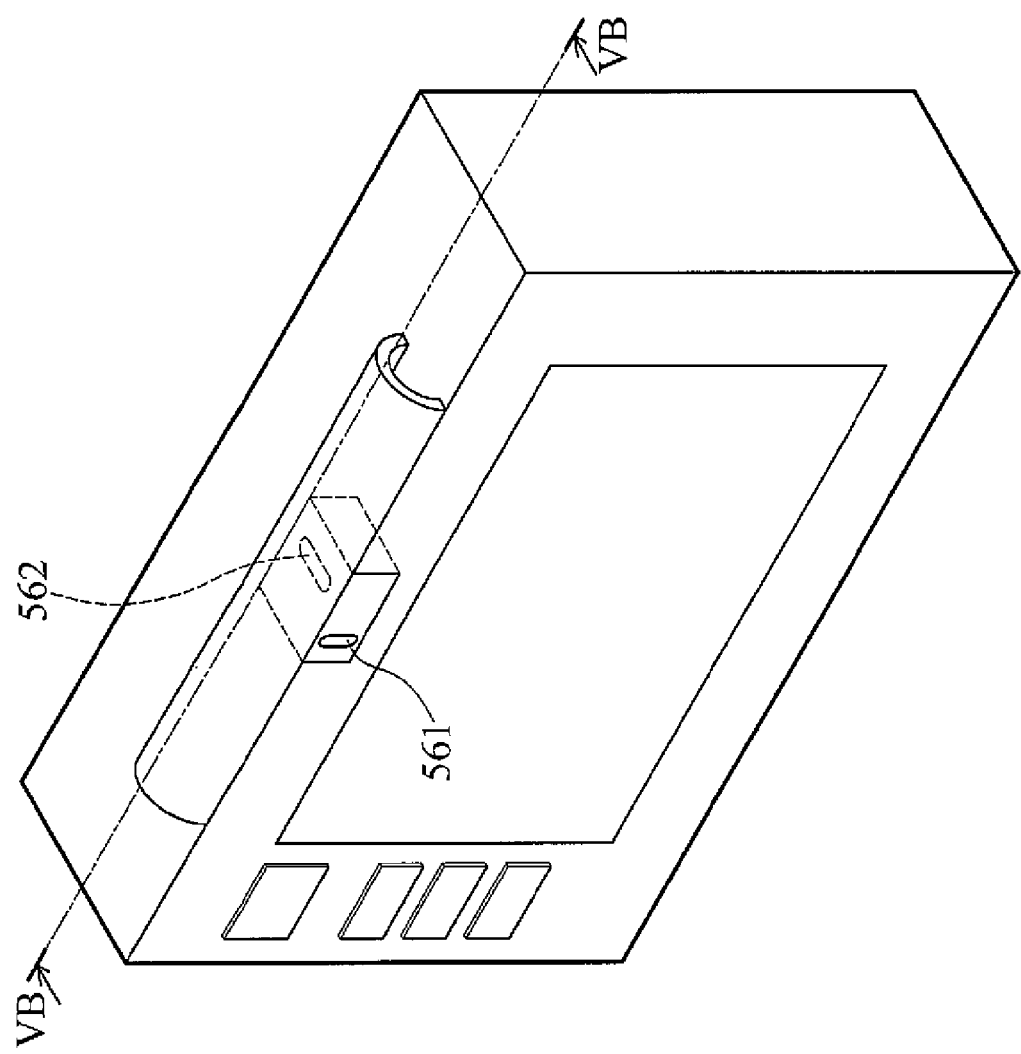
FIG. 5A depicts a device with an acoustic guard in accordance with another embodiment of the invention.
Figure 5B:
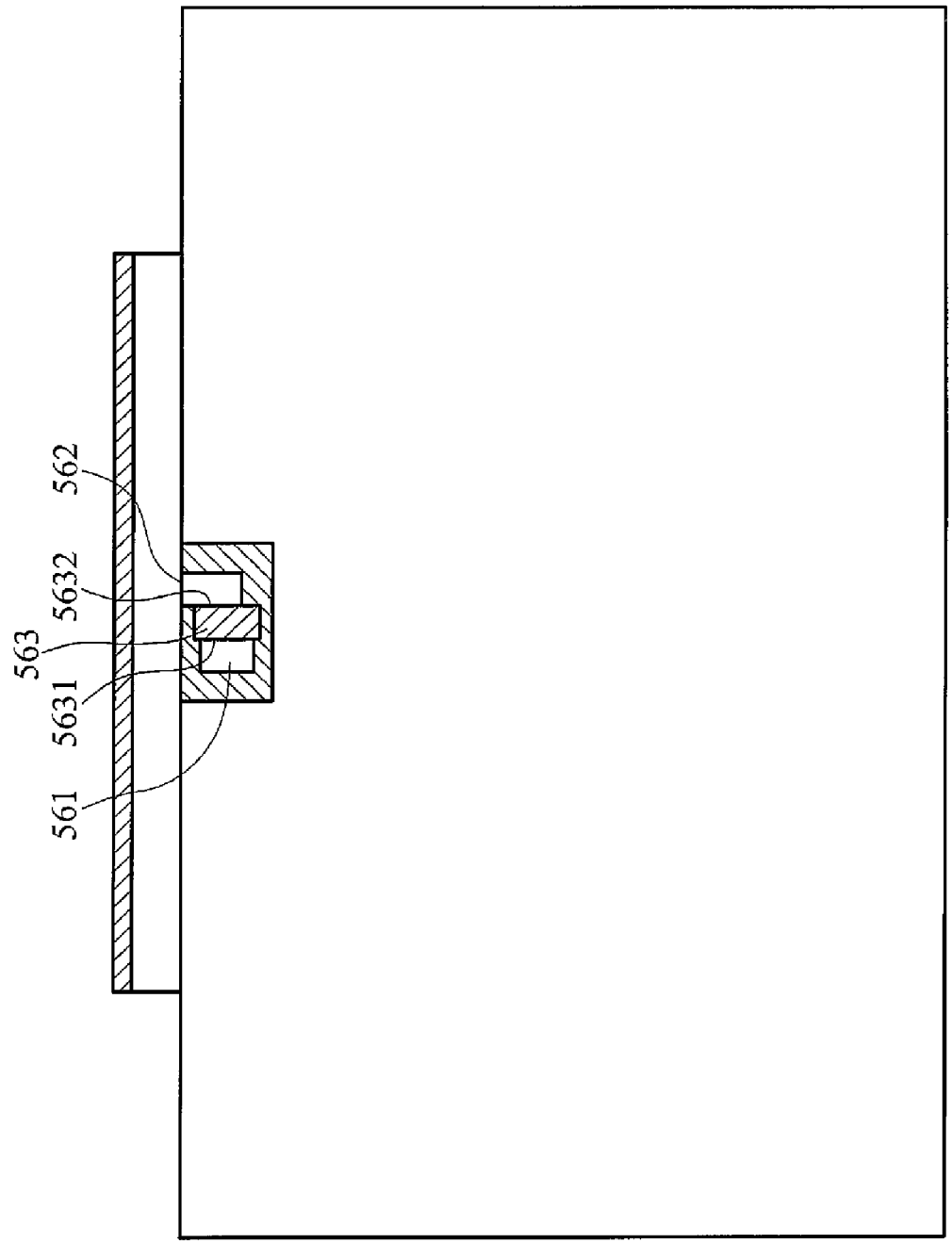
FIG. 5B is a sectional view of the device of FIG. 5A along line VB-VB.

FIGS. 5A and 5B depict another embodiment of the invention, wherein the front surface 5631 of the unidirectional microphone 563 faces left and receives external sound via the first acoustic opening 561 opening towards the front. Furthermore, the rear surface 5632 of the unidirectional microphone 563 faces right and receives external sound via the second acoustic opening 562 opening upwards.

Figure 6:
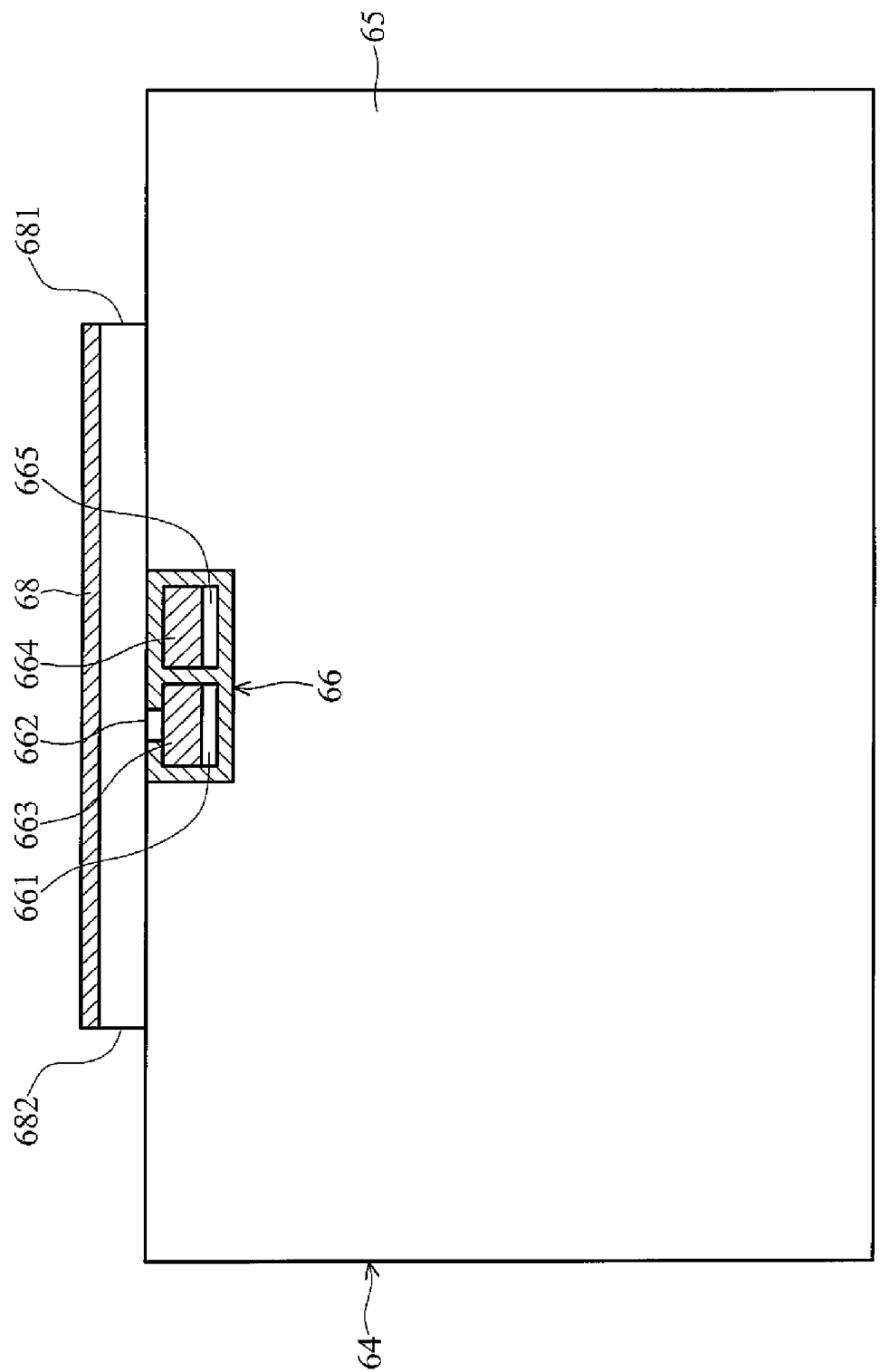
FIG. 6 depicts a device with an acoustic guard in accordance with another embodiment of the invention.

FIG. 6 depicts another embodiment of the invention, wherein the microphone module 66 includes a unidirectional microphone 663 and an omnidirectional microphone 664 disposed in different chambers and acoustically isolated from each other. An acoustic guard 68 is attached to the main body 65 of the device 64 and covers the second acoustic opening 662. In operation, the omnidirectional microphone 664 receives external sound via a third acoustic opening 665. The unidirectional microphone 663 receives external sound via the first acoustic opening 661 and the second acoustic opening 662, wherein sound waves enter via the sound inlets 681 and 682 at both ends of the sound guard 68 and then reach the second acoustic opening 662.

Figure 7:
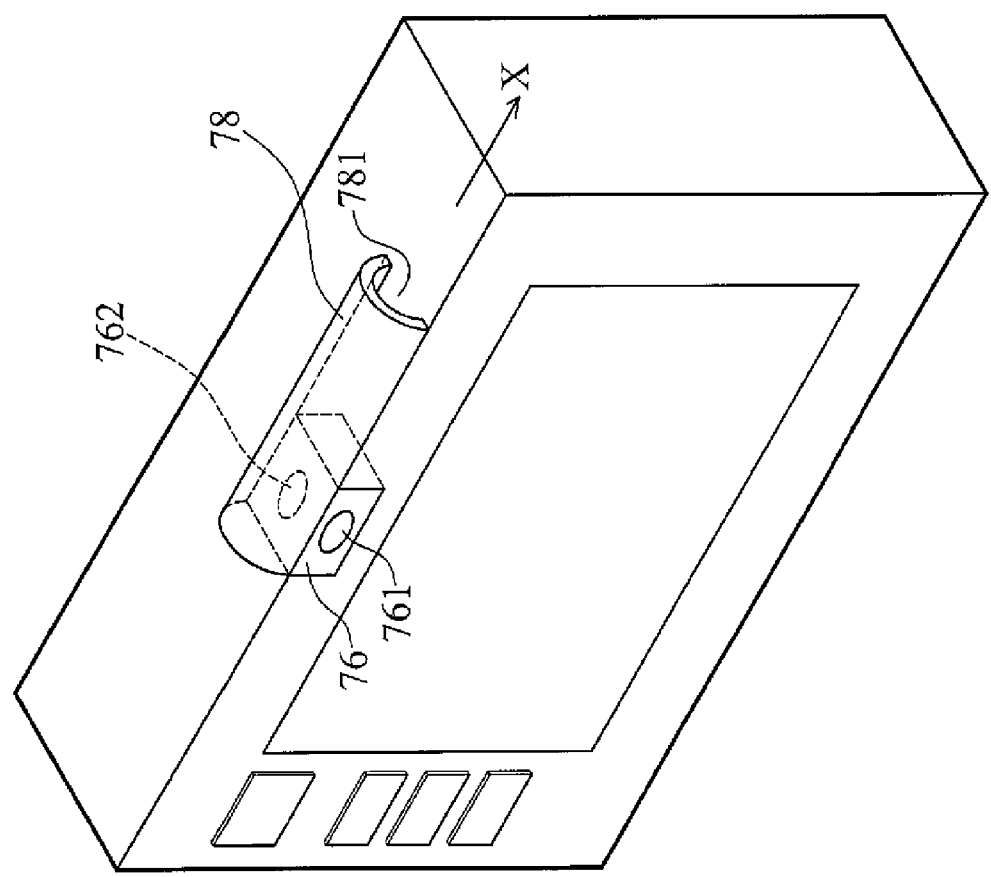
FIG. 7 depicts a device with an acoustic guard in accordance with another embodiment of the invention.

FIG. 7 depicts another embodiment of the invention, wherein the acoustic guard 78 is closed at an end and opens at the other end. In detail, the acoustic guard 78 extends in a first direction X and opens towards the same direction X at the other end thereof. In operation, the microphone module 76 receives external sound via a first acoustic opening 761 and a second acoustic opening 762, wherein sound waves enter the sound guard 78 via the sound inlet 781 at the open end thereof and then reach the second acoustic opening 762.

Figure 8:
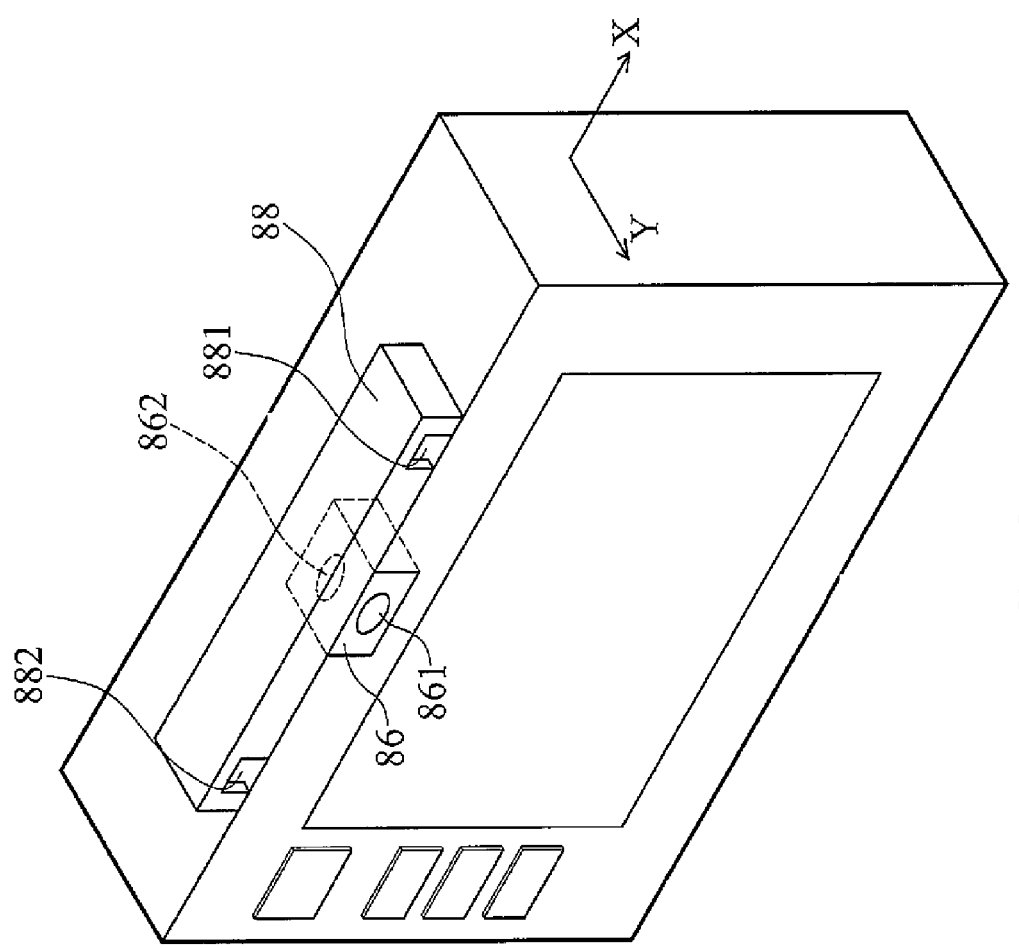
FIG. 8 depicts a device with an acoustic guard in accordance with another embodiment of the invention.

FIG. 8 depicts another embodiment of the invention, wherein the acoustic guard 88 opens at both ends. In detail, the acoustic guard 88 extends in a first direction X and has sound inlets 881 and 882 at both ends. The sound inlets 881 and 882 open towards a second direction Y perpendicular to the first direction X. In operation, the microphone module 86 receives external sound via a first acoustic opening 861 and a second acoustic opening 862, wherein sound waves enter the sound guard 88 via the sound inlets 881 and 882 and then reach the second acoustic opening 862 of the microphone module 86.

Figure 9:
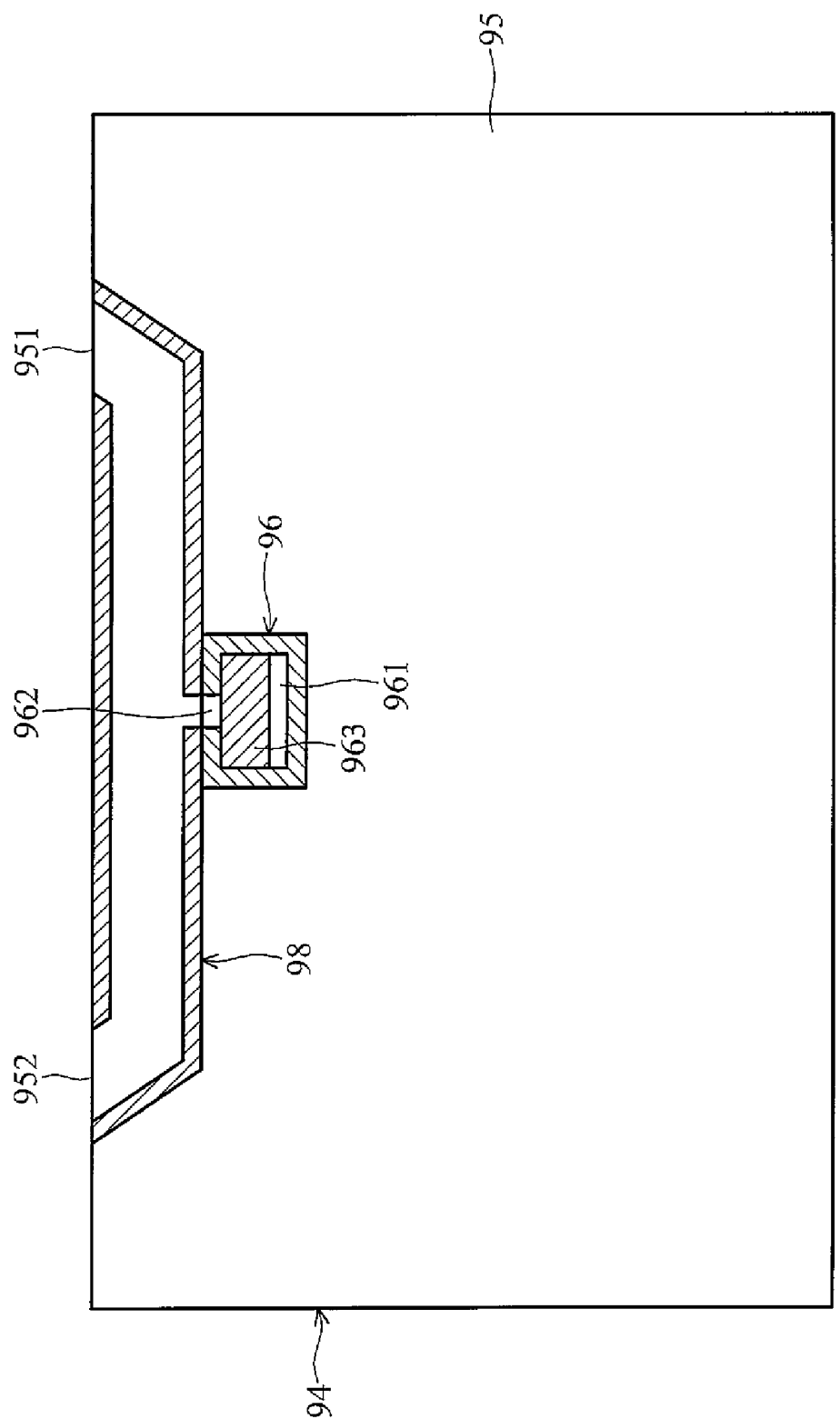
FIG. 9 depicts a device with a built-in tube in accordance with another embodiment of the invention.

FIG. 9 depicts another embodiment of the invention, wherein the device 94 includes a main body 95, a microphone module 96, and a tube 98 built in the main body 95. The microphone module 96 includes a first acoustic opening, a second acoustic opening, and a unidirectional microphone 963 receiving sound via the first and second acoustic openings 961 and 962. The tube 98 has a first sound inlet 951 and a second sound inlet 952 at both ends, introducing sound waves to the second acoustic opening 962 of the microphone module 96.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A device, comprising:
   a main body;
   a microphone module connected to the main body, comprising a first acoustic opening and a second acoustic opening, wherein the microphone module receives sound waves via both the first and second acoustic openings; and
   an acoustic guard covering the second acoustic opening and comprising a first sound inlet via which the sound waves enter the acoustic guard and reach the second acoustic opening;
   wherein the microphone module further comprises a unidirectional microphone receiving the sound waves via the first and second acoustic openings, a third acoustic opening, and an omnidirectional microphone receiving the sound waves via the third acoustic opening.

2. The device as claimed in claim 1, wherein the acoustic guard is oriented lengthwise.

3. The device as claimed in claim 2, wherein the first sound inlet is provided at an end of the acoustic guard.

4. The device as claimed in claim 3, wherein the acoustic guard further comprises a second sound inlet provided at another end thereof.

5. The device as claimed in claim 1, wherein the unidirectional microphone comprises a front surface receiving the sound waves via the first acoustic opening, and a rear surface receiving the sound waves via the second acoustic opening.

6. The device as claimed in claim 1, wherein the unidirectional microphone and the omnidirectional microphone are disposed in different chambers and acoustically isolated from each other.

7. The device as claimed in claim 1, wherein the main body comprises a top, with the acoustic guard attached thereto.

8. The device as claimed in claim 1, wherein the main body comprises a bottom, with the acoustic guard attached thereto.

9. A device, comprising:
a main body;
a microphone module connected to the main body, comprising a first acoustic opening and a second acoustic opening, wherein the microphone module receives sound waves via both the first and second acoustic openings; and
an acoustic guard covering the second acoustic opening, being oriented lengthwise, and opening at an end thereof;
wherein the microphone module further comprises a unidirectional microphone receiving the sound waves via the first and second acoustic openings, a third acoustic opening, and an omnidirectional microphone receiving the sound waves via the third acoustic opening.

10. The device as claimed in claim 9, wherein the acoustic guard extends in a first direction, and opens towards the first direction.

11. The device as claimed in claim 9, wherein the acoustic guard extends in a first direction, and opens towards a second direction perpendicular to the first direction.

12. The device as claimed in claim 9, wherein the acoustic guard is closed at another end.

13. The device as claimed in claim 9, wherein the acoustic guard opens at both ends.

14. The device as claimed in claim 9, wherein the unidirectional microphone comprises a front surface receiving the sound waves via the first acoustic opening, and a rear surface receiving the sound waves via the second acoustic opening.

15. The device as claimed in claim 9, wherein the unidirectional microphone and the omnidirectional microphone are disposed in different chambers and acoustically isolated from each other.

16. The device as claimed in claim 9, wherein the main body comprises a top, with the acoustic guard attached thereto.

17. The device as claimed in claim 9, wherein the main body comprises a bottom, with the acoustic guard attached thereto.

18. A device, comprising:
a main body;
a microphone module connected to the main body, comprising a first acoustic opening and a second acoustic opening, wherein the microphone module receives sound waves via both the first and second acoustic openings; and
a tube comprising a first sound inlet via which the sound waves enter the tube and reach the second acoustic opening;
wherein the microphone module further comprises a unidirectional microphone receiving the sound waves via the first and second acoustic openings, a third acoustic opening, and an omnidirectional microphone receiving the sound waves via the third acoustic opening.

19. The device as claimed in claim 18, wherein the tube further comprises a second sound inlet connected to the second acoustic opening of the microphone module.

20. The device as claimed in claim 18, wherein the tube is built in the main body.

* * * * *